US009390253B2

(12) United States Patent
Hansen

(10) Patent No.: US 9,390,253 B2
(45) Date of Patent: Jul. 12, 2016

(54) METHOD AND A SYSTEM FOR BINDING AN AUDIO ACCESSORY DEVICE WITH A PROGRAM APPLICATION

(71) Applicant: GN Netcom A/S, Ballerup (DK)

(72) Inventor: Lars Bohn Hansen, Holte (DK)

(73) Assignee: GN Netcom A/S (DK)

( * ) Notice: Subject to any disclaimer, the term of this patent is extended or adjusted under 35 U.S.C. 154(b) by 117 days.

(21) Appl. No.: 14/209,233

(22) Filed: Mar. 13, 2014

(65) Prior Publication Data

US 2014/0273966 A1 Sep. 18, 2014

Related U.S. Application Data

(60) Provisional application No. 61/788,205, filed on Mar. 15, 2013.

(51) Int. Cl.
*H04M 1/66* (2006.01)
*G06F 21/44* (2013.01)
*H04M 1/60* (2006.01)
*H04W 12/06* (2009.01)

(52) U.S. Cl.
CPC ............ *G06F 21/44* (2013.01); *H04M 1/6058* (2013.01); *H04W 12/06* (2013.01)

(58) Field of Classification Search
CPC ... H04M 1/6066; H04M 1/6033; H04M 1/05; H04M 1/0256; H04M 2250/02; H04M 1/6058; H04M 1/66; H04M 3/56; G06T 1/0071; G06T 1/0028; G07D 7/004; H04R 2420/07; H04R 5/033; H04W 12/06; H04W 4/005
See application file for complete search history.

(56) References Cited

U.S. PATENT DOCUMENTS

| 7,062,260 | B2 | 6/2006 | Vuori |
| 8,055,307 | B2 | 11/2011 | Rahman et al. |
| 2009/0186668 | A1* | 7/2009 | Rahman .............. H04M 1/6066 455/575.2 |
| 2012/0096111 | A1 | 4/2012 | Jellinek |
| 2012/0109827 | A1 | 5/2012 | Otterstrom |
| 2012/0167232 | A1* | 6/2012 | Moosavi .............. H04W 12/06 726/29 |

FOREIGN PATENT DOCUMENTS

EP 2397979 12/2011

OTHER PUBLICATIONS

Partial European Search Report dated Oct. 9, 2015 for European patent application EP 13174272.

* cited by examiner

*Primary Examiner* — Ronald Eisner
(74) *Attorney, Agent, or Firm* — Altera Law Group, LLC

(57) ABSTRACT

Disclosed are audio accessory devices and systems for being connected to one or more user devices and related methods. The system comprises an audio accessory device having at least one speaker and being configured to connect to at least one user device for providing audio from the user device to the audio accessory device and a computer program application accessible from the at least one user device. A verification ID is provided external of the audio accessory device and comprises audio accessory device identification information identifying a specific audio accessory device. The system furthermore comprises a user interface facilitating interaction between a user of the audio accessory device and the user device, and allows for user facilitated entering of the verification ID. A verification server may be configured to receive the verification ID from the user device and to verify the user device for use with the computer program application, if the verification ID is valid.

16 Claims, 4 Drawing Sheets

METHOD AND A SYSTEM FOR BINDING AN AUDIO ACCESSORY DEVICE WITH A PROGRAM APPLICATION

FIELD OF INVENTION

The present invention relates to audio accessory devices for being connected to one or more user devices. The audio accessory devices are being provided together with a verification ID, and the invention relates specifically to an audio accessory device verification system and a method of validating use of the audio accessory system, and a system and a method for verification of a user device validating use of a specific audio accessory device if one or more predetermined criteria are fulfilled.

BACKGROUND OF THE INVENTION

Headsets are being used intensively, both for office use and for private use. The headsets, such as headsets and headphones, are used for communication while driving, while walking or in the office, and the headsets are moreover used for listening to music, to podcasts, to coaching or language sessions, etc. Furthermore, also smaller speakers and speakerphones are being used for sharing audio anywhere. Thus, the headsets connect to user devices, such as to user computing devices, to computers, tablets, smart phones, cell phones, music devices, etc. to provide content from the computing devices to the headsets.

Typically, the headsets and/or other accessory devices, may be used with an application program on the user device, and for some accessory devices, the accessory device may identify itself towards the computing device, for example in U.S. Pat. No. 7,062,260, a mobile terminal is capable of obtaining an application for an accessory of the mobile terminal from a telecommunications network when the accessory device has identified itself towards the mobile terminal.

In U.S. Pat. No. 8,055,307, a method for providing for example a handsfree service to a user of a wireless headset is provided, wherein the headset provides data to the computing device to thereby initiate installing of an application on the connected computing device. Also, in US 2012/009111, a headset signals its identity to a communications device and the communications device may hereafter use a communications network to locate additional data and/or updated data regarding the headset and/or its interoperability with the communications device.

However, for those headsets as described above, the headset needs to identify itself towards a communication device or network, thus, the headset needs to have processing or communications capabilities.

SUMMARY OF THE INVENTION

It is an object of the present invention to provide an improved method and system for binding an audio accessory device, such as a headset, to a computer program application.

According to one aspect of the present invention, a system for verification of a user device is provided, wherein the system comprises an audio accessory device having at least one speaker and being configured to connect to at least one user device for providing audio from the user device to the audio accessory device and a computer program application accessible from the at least one user device. A verification ID is provided external of the audio accessory device and comprises audio accessory device identification information identifying a specific audio accessory device. The system further-more comprises a user interface facilitating interaction between a user of the audio accessory device and the user device, and allows for user facilitated entering of the verification ID. A verification server may be configured to receive the verification ID from the user device and to verify the user device for use with the computer program application, if the verification ID is valid.

According to another aspect of the present invention, an audio accessory device verification system is provided, the system comprising an audio accessory device having at least one speaker and being configured to connect to at least one user device for providing audio from the user device to the audio accessory device, a verification ID being provided external of the audio accessory device, the verification ID identifying a specific audio accessory device. The system furthermore comprises a request server configured to receive verification requests comprising the verification ID, a database for storing datasets comprising corresponding sets of verification ID, one or more validation parameters and a predetermined criteria. A validation server may be configured to validate use of a specific audio accessory device if the verification ID is found in the database and if the corresponding one or more validation parameters fulfil the predetermined criteria.

The system may further comprise a counter and the one or more validation parameters may comprise a count value. The counter may be configured to increase the count value by each validation of the specific audio accessory device and/or by each validation request received. The predetermined criteria may comprise a predetermined maximum number of allowable validations so that use of the specific audio accessory device is validated if the count value is less than or equal to the predetermined maximum number of allowable verifications.

According to another aspect of the present invention, a method of verifying a computer program application for use with an audio accessory device is provided, wherein the audio accessory device is configured to connect to at least one user device for providing audio from the user device to the audio accessory device. The method may comprise generating a verification ID externally of the audio accessory device, the verification ID comprising audio accessory device identification information identifying the audio accessory device. The method comprises the step of providing the audio accessory device together with the verification ID. The method further comprises the step of initiating installation of a computer program application on the at least one user device, entering the verification ID on the user device via a user device user interface, and sending the verification ID to a verification server to determine whether the verification ID is valid. If it is determined by the verification server and corresponding processing elements that the verification ID is valid then the user device may be verified for use with the computer program application.

According to another aspect of the present invention, a method of validating use of an audio accessory device is provided. The audio accessory device having at least one speaker and being configured to connect to at least one user device for providing audio from the user device to the audio accessory device. The method comprises providing a verification ID together with an audio accessory device, the verification ID being provided external of the audio accessory device and identifying a specific audio accessory device, sending via the user device, a request comprising the verification ID to a request server configured to receive verification requests, comparing the verification ID with a plurality of stored verification IDs to find a matching verification ID, validating use of a specific audio accessory device if a matching verification ID is found, and if one or more predetermined criteria are fulfilled.

According to a further aspect of the present invention, a method of binding an audio accessory device to a user device application is provided. The method comprises the steps of generating a unique code identifying an audio accessory device, storing the unique code in a database comprising a number of generated unique codes, extracting a unique code from the database and providing the code together with the audio accessory device, downloading the computer program application from an application server to a user device and entering the unique code on the user device and transmitting it to the database, verifying the code, and if the code is valid, activating the user device application on the user device.

The audio accessory device may be a headset, such as a headset comprising a microphone for voice communication, such as a headset having one or more headphones (and no microphone), the headset may comprise one or two headphones for providing audio from a user device to the headset, the audio accessory device may be a speaker, such as a loudspeaker, or a speakerphone. The speaker may be a portable speaker.

The audio accessory device may be a wired audio accessory device having a wired connection to the user device to thereby establish an audio connection via for example an audio jack, such as a jack having mono- or stereo compatibilities, or for example via a USB, a mini USB or a micro USB connection. The audio accessory device may also be connected wirelessly via any protocol, such as WiFi, such as LAN, such as WLAN, such as Bluetooth, DECT, etc. to thereby transfer audio or other information via the wireless connection. The audio accessory device may be an audio accessory device having no means for electronically communicating a verification ID from the audio accessory device to the user device.

It is an advantage of the present invention that the verification ID or code is provided externally from the audio accessory device so that no information needs to be exchanged from the audio accessory device to the user device.

It is an advantage of the present invention that the verification ID is provided to a verification server which server determines whether the verification ID is valid or not, so that the user device application is only activated if the verification ID is valid.

The verification ID may be valid if one or more predetermined criteria are met. The verification ID may for example be valid if the verification ID forms part of a database, such as part of a database forming part of the server. Furthermore, the verification ID may be valid for a predetermined number of verifications, or the verification ID may be valid if sent from a specific type or make of user device, etc.

The verification server may for example store information of previous verifications performed for a specific verification ID, and the server may for example comprise a counter of any type to indicate how many times a specific verification ID has been used. Hereby, a predetermined maximum number of verifications may be set, so that thereby, a verification ID may only be valid for the predetermined maximum number of verifications.

It is an advantage of providing a predetermined number of verifications for which the verification ID is valid in that in this way the verification ID, as provided together with the audio accessory device, may be used to download one or more specific user device applications a limited number of times. The verification ID may for example be provided as a printed code provided together with the audio accessory device, such that for example the audio accessory device and the printed verification ID or code is provided together in a box. The printed verification ID may be a code, such as a voucher or a unique ID card.

Thereby, for example, if an audio accessory device user would like to use an audio accessory device with any of his user devices, such as with his personal computer, his tablet and his smartphone, it will be possible for the audio accessory device user to download a user device application, or a computer program application, for use with the audio accessory device on these devices, however, attempts to share the audio accessory device identification ID to a larger group of audio accessory device users may be prohibited. The computer program application may be a software application and it may cause the user device onto which it is downloaded to perform certain tasks in a manner well-known to the person skilled in the art.

It is an advantage of the present invention that as part of a total product offering, a computer program application, such as a smartphone application (app) or tablet PC application may be offered (free) to customers/users who purchase a corded and/or wireless audio accessory device, for example to customers who purchase an audio accessory device from a specific vendor/manufacturer, without allowing other users to access the computer program application. It is a further advantage that the user base for a specific computer program application is limited to those who have purchased the audio accessory device of a particular company.

The computer program application may run on smartphones, tablet PCs, etc. having iOS, Android, Windows, etc. operating systems supporting the use of third party computer program applications.

The audio accessory devices may connect to user devices, such as to user computing devices, computers, tablets, smart phones, cell phones, music devices, etc. to provide content from the user devices to the headsets.

It is a still further advantage of the present invention that customers who have purchased a company audio accessory device, i.e. an audio accessory device allowing for use of the computer program application, may use the computer program application on a limited number of smartphone or tablet devices, such as 5 or 10 times. It is an advantage that the number of devices for which the computer program application may be used is limited by the present invention. Hereby, even if the audio accessory device supports for example Bluetooth and may provide vendor information to the computer program application, the number of downloads may, by using the present invention, be controlled.

Thereby, if there are limitations regarding the use of the user device application, such as the computer program application, such as providing the user device application exclusively to holders of a valid verification ID, if for example a manufacturer is paying a license for each audio accessory device sold, etc. this may be controlled.

The verification ID may comprise audio accessory device information selected from the group of audio accessory device model information and/or audio accessory device manufacturer information, etc.

The verification ID may for example be a unique code identifying an audio accessory device. The unique code may be generated, for example automatically, by code generating means. The unique code may be stored in a database comprising a number of generated unique codes, and a unique code may be extracted from the database and be provided together with the audio accessory device. Thus, there is a unique combination of audio accessory device and unique code which combination may be stored in the database.

Hereby, the unique code may comprise information about the audio accessory device model, make, manufacturer, etc.

Hereby, even if the audio accessory device does not comprise any processing means capable of communicating information about for example audio accessory device type, audio accessory device model information, audio accessory device manufacturer information, etc., this information may nevertheless be provided to the user device and hence to the verification server via the verification ID.

The verification ID may comprise an alphanumerical code, a QR code or a bar code, or any other code type for being provided to a user device via a user interface. The user interface may comprise a keyboard, a touch screen, a camera, a scanner, a touch display, etc. for inputting the verification ID to the computer program application.

The computer program application may comprise a processor, and the processor may perform processing operations on computer program application input audio. The processor may for example be configured to process audio received by the computer program application, for example the computer application input audio may be processed using audio enhancement algorithms. In one or more embodiments, the computer program application may be configured to receive audio from an audio source, to process the received audio according to audio enhancement algorithms provided in the processor, and provide a processed audio output, such as an audio enhanced output to the audio accessory device.

The processor may furthermore interact with the output to and/or input from the audio accessory device. Thus, there may be an interaction between the audio accessory device and the computer program application. For example, information or signals from the audio accessory device may form input to the computer program application and the output of the computer program application may be processed according to the input signals or input information.

In one or more embodiments, the audio accessory device may comprise one or more sensors for measuring one or more physiological measurements of the user, and the computer program application may be configured to receive user physiological measurements from the audio accessory device, such as for example pulse, blood pressure, user monitoring parameters, etc. and apply processing algorithms in response to the received user physiological measurements.

Alternatively, the audio accessory device may receive information on one or more physiological measurements of the user from sensors positioned at the user body. The computer program application may furthermore be configured to provide a processed audio output to the user in response to the received physiological measurements. For example, the computer program application may receive and acoustically present at least one received physiological parameter to the user.

The audio accessory device may be any audio accessory device, such as any headset type and the headset type may comprise in-the-ear headsets and over the ear headsets, mono headsets, stereo headsets, binaural headsets, monaural headsets, sports or fitness headsets, etc. The headset may comprise a microphone, and/or the headset may have one or two headphones. The audio accessory device may be a speaker, such as a loudspeaker, or a speakerphone.

The audio accessory device may be verified to a specific user device and the computer program application may be activated by for example accessing, on the user device, a first user device application platform and initiating activation of a computer program application, and upon validation of the verification ID, automatically complete the activation of the computer program application.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout. Like elements will, thus, not be described in detail with respect to the description of each figure.

DETAILED DESCRIPTION OF THE DRAWINGS

Figure 1:
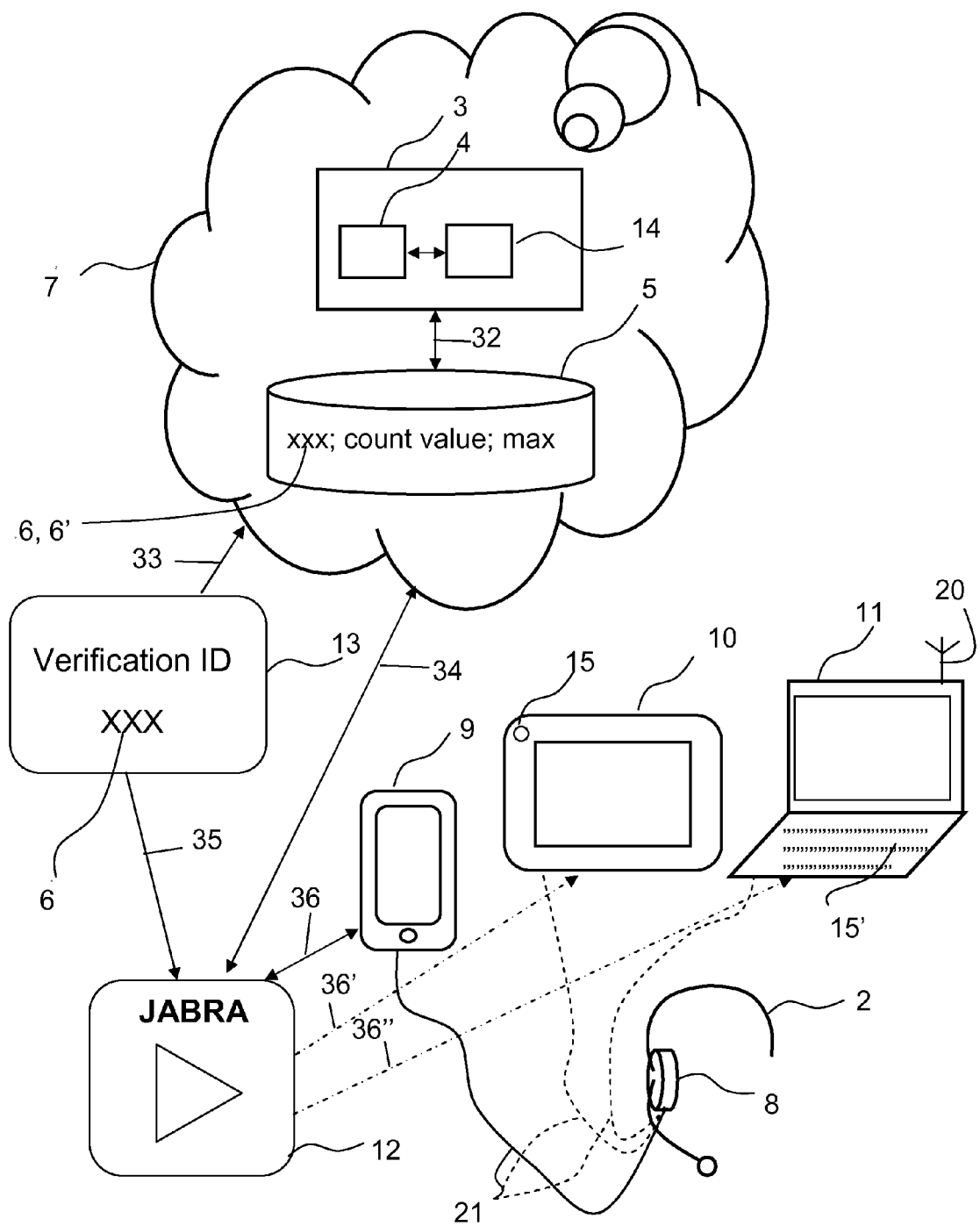
FIG. 1 shows an audio accessory device verification system according to the present invention.

In FIG. 1, a system for verification of an audio accessory device 2, in this case a headset 2, is shown. The system comprises a server 3 having a code generating server 4 for generation of verification codes 6. The codes are stored in a database 5 and paired with an audio accessory device 2. The data sets in the database 5 thus comprises the verification codes 6 and information about the corresponding audio accessory device 2, i.e. about the audio accessory device 2 matched with the verification code 6. The server has a web interface 7 and is accessible via a network, such as the internet, a telecommunications network, or any other network.

The system as shown in FIG. 1 further comprises an audio accessory device 2 and user devices 9, 10, 11. The audio accessory device has at least one speaker 8 and is configured to connect to at least one user device 9, 10, 11 for providing audio from the user device 9, 10, 11 to the audio accessory device 2. The audio accessory device may connect, via connection or communication link 21, to the at least one user device using a wired connection, a wireless connection, or a combination of wired and wireless connection, e.g. to provide audio via the wired connection, and information and/or control signals via the wireless connection. At least one computer program application 12 may be accessible from the at least one user device 9, 10, 11.

The verification code 6, such as the verification ID, is provided external of the audio accessory device. For example, the verification code 6 is printed on an ID card 13 and the ID card 13 is shipped together with the audio accessory device 2. The verification code 6 may comprise audio accessory device identification information identifying a specific audio accessory device, so that the verification code may contain information about the make, type and model of the audio accessory device. The verification code may be entered via any user interface means, such as by camera 15 or keyboard 15', etc.

A user interface 15, 15' is typically provided for the user device, 9, 10, 11 facilitating interaction between a user of the audio accessory device and the user device 9, 10, 11, and the user interface 15,15' may allow for user facilitated entering of the verification ID, i.e. the verification code, 6. The verification code 6 may be entered at the time of initiating a download, i.e. at the computer program application access point, such as at an app-store or market place, alternatively, the verification code may be entered after download of the computer program application to activate the program.

The server 3 may be configured to receive the verification code 6 from the user device 9, 10, 11. The verification code 6 may for example be sent from computer program application 12 via user device network interface 20 to the server 3 via the internet, such as via communication link 34. Once the verification code 6 is received by the server 3, the server 3 verifies that the audio accessory device 2 may be used with user device 9, 10, 11 for use with the computer program application, if the verification code 6 is valid. Thus, at the server 3, the received verification code 6 is compared to verification codes 6' stored in the database 5. Firstly, it is checked if the verification code 6 corresponds to one of the verification codes 6' as stored in the database 5. A counter 14 is provided, and the count value of the counter 14 is increased by one each time a check of verification code 6 is performed. The counter 14 has a predetermined maximum count value for each code. Thus, the datasets in the database 5 may comprise the further information of count value and maximum count value. Thus, if the first check is positive, i.e. that the verification code 6 is indeed present in the database 5, a second check is performed to see if the new count value is at or below the maximum count value. In the affirmative, the verification code 6 is valid and a message is provided to the user device 9, 10, 11 to confirm that the verification code 6 is valid and that the computer program application may be activated, or that the download of the computer program application may be completed.

Thus, if the user for example, uses the audio accessory device with his smartphone 9, the user will initiate a download of the computer program application to his smartphone 9 and enter the verification code 6 at his smartphone 9. As this is the first user device with which the code is entered, the counter 14 will be increased to "one" and the user can use the computer program application 12 with audio accessory device 2 and smartphone 9. When the user wants to use his audio accessory device 2 with his tablet 10, such as an iPad, he enters the verification code 6, the counter 14 is increased to "two" and the computer program application 12 may be used on his tablet 10 with the audio accessory device 6, and the same procedure is performed to activate the computer program application 12 with his computer 11, increasing the count value to "three". A user may have an increasing number of devices with which the audio accessory device is used, thus, a single activation is rarely sufficient, it is therefore an advantage of storing a count value and a maximum count value in that the user may hereby activate the computer program application 12 for all his user devices 9, 10, 11. Typically, the maximum count value is set to e.g. 5 or 7.

Figure 2:
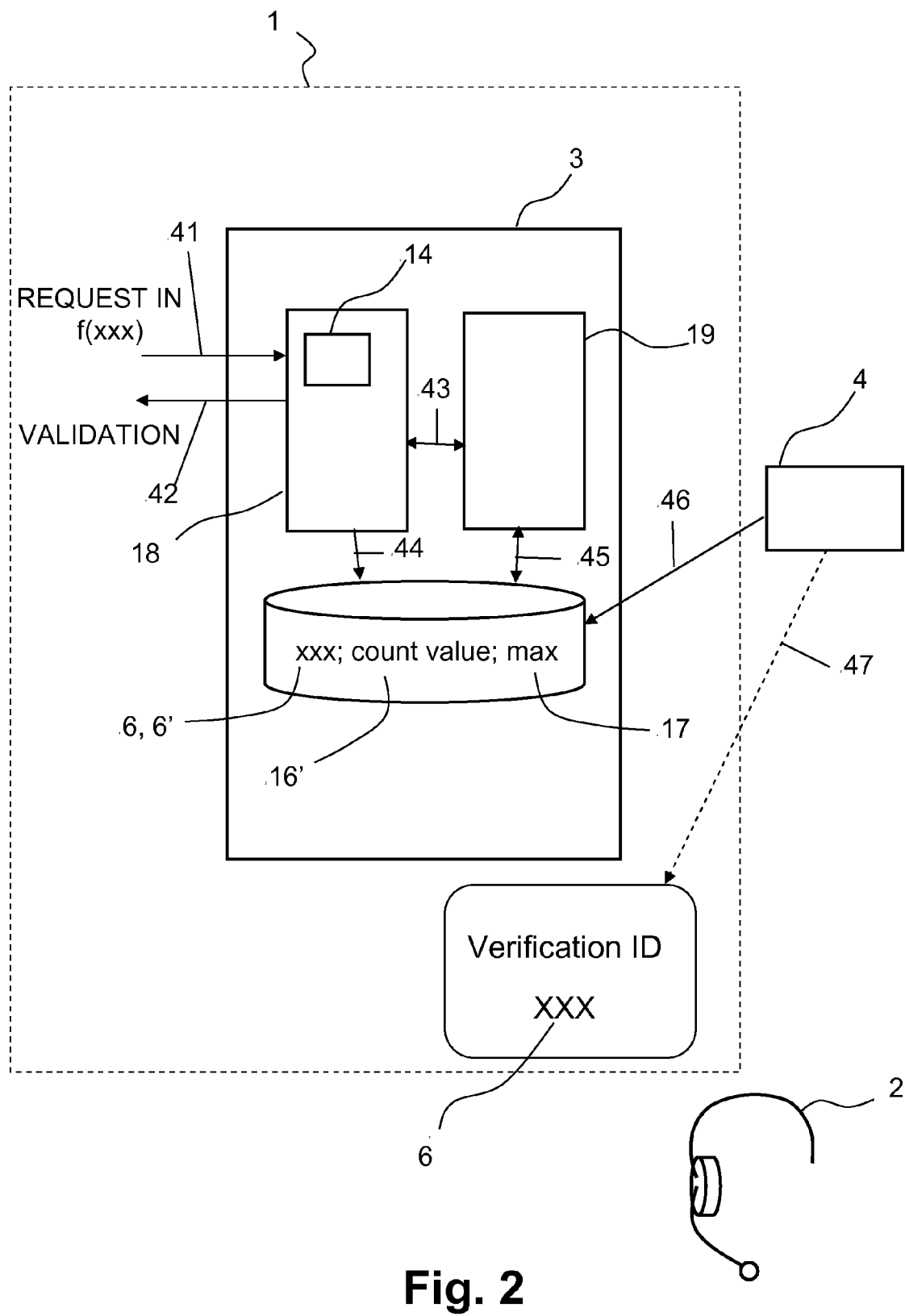
FIG. 2 shows schematically an audio accessory device for use in the system.

In FIG. 2 an audio accessory device verification system 1 is shown. A verification code 6 is provided to identify an audio accessory device, such as for example a headset. The verification ID may be generated by a code generating server 4 and the code may for example be printed on an ID card or voucher to provide with the audio accessory device, such as the headset, for example from the manufacturer.

The system 1 comprises a request server 18 configured to receive verification requests comprising the verification ID. The request server 18 may be included with server 3, such as a web server 3 and may receive the requests via a network, such as the internet. The request server 18 comprises a counter 14 configured to increase a count value for each received verification request relating to a specific verification ID 6. The system 1 further comprises a database 5 for storing datasets comprising corresponding sets of verification ID 6, count value 16 and a maximum count value 17. A validation server 19 is configured to validate use of a specific audio accessory device if the verification ID 6 is found in the database 5 and if the corresponding count value 16 is less than the maximum count value 17.

Figure 3:
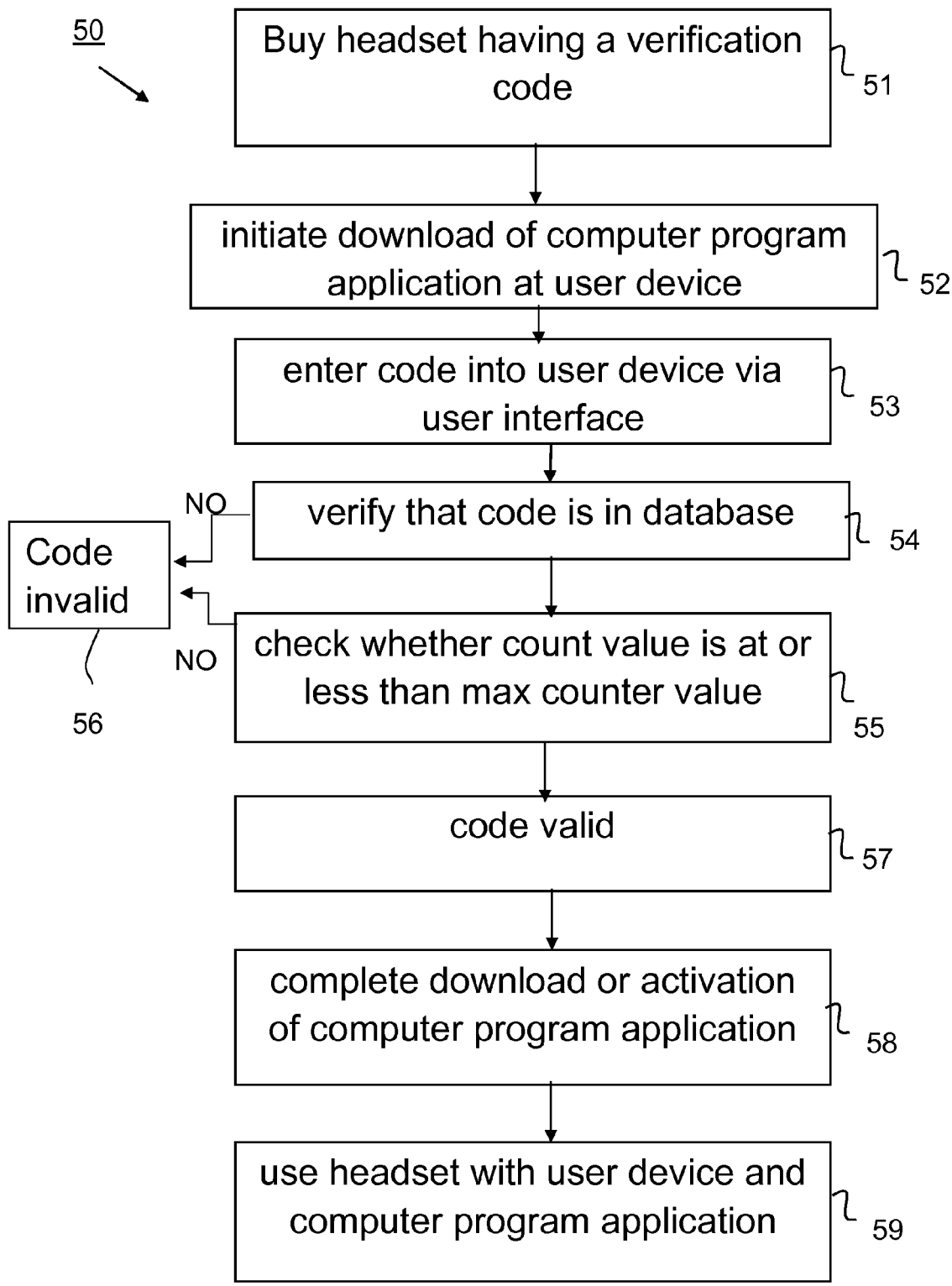
FIG. 3 is a flow chart illustrating a method of verifying a computer program application for use with an audio accessory device.

In FIG. 3 a method 50 of verifying a user device for use with a computer application program configured to communicate with an audio accessory device is provided. The method comprises, in step 51, buying or providing an audio accessory device together with a verification ID, typically, the verification ID is being provided external of the audio accessory device and comprises audio accessory device identification information identifying the audio accessory device. In step 52, an installation of a computer application program on the at least one user device is initiated. In step 53, the verification ID is entered on the user device via a user device user interface, in step 54, it is verified that the verification ID is present in the database. If the verification ID is not present in the database, the code or verification ID is invalid, step 56. In step 55, it is checked whether the count value is at or less than a maximum count value. If the count value is higher than the maximum count value, then the verification ID is invalid, step 56. However, if both criteria are fulfilled, the code is valid, step 57. In step 58, the download of the computer program application may be completed, or the computer program application may be activated and the audio accessory device, in this case a headset, may be used with the user device and the computer program application.

By having a maximum count value, it is ensured that the user does not allow all his colleagues, friends and family to activate or download the computer program application for use with their, un-original or non-authorized, audio accessory devices.

Figure 4:
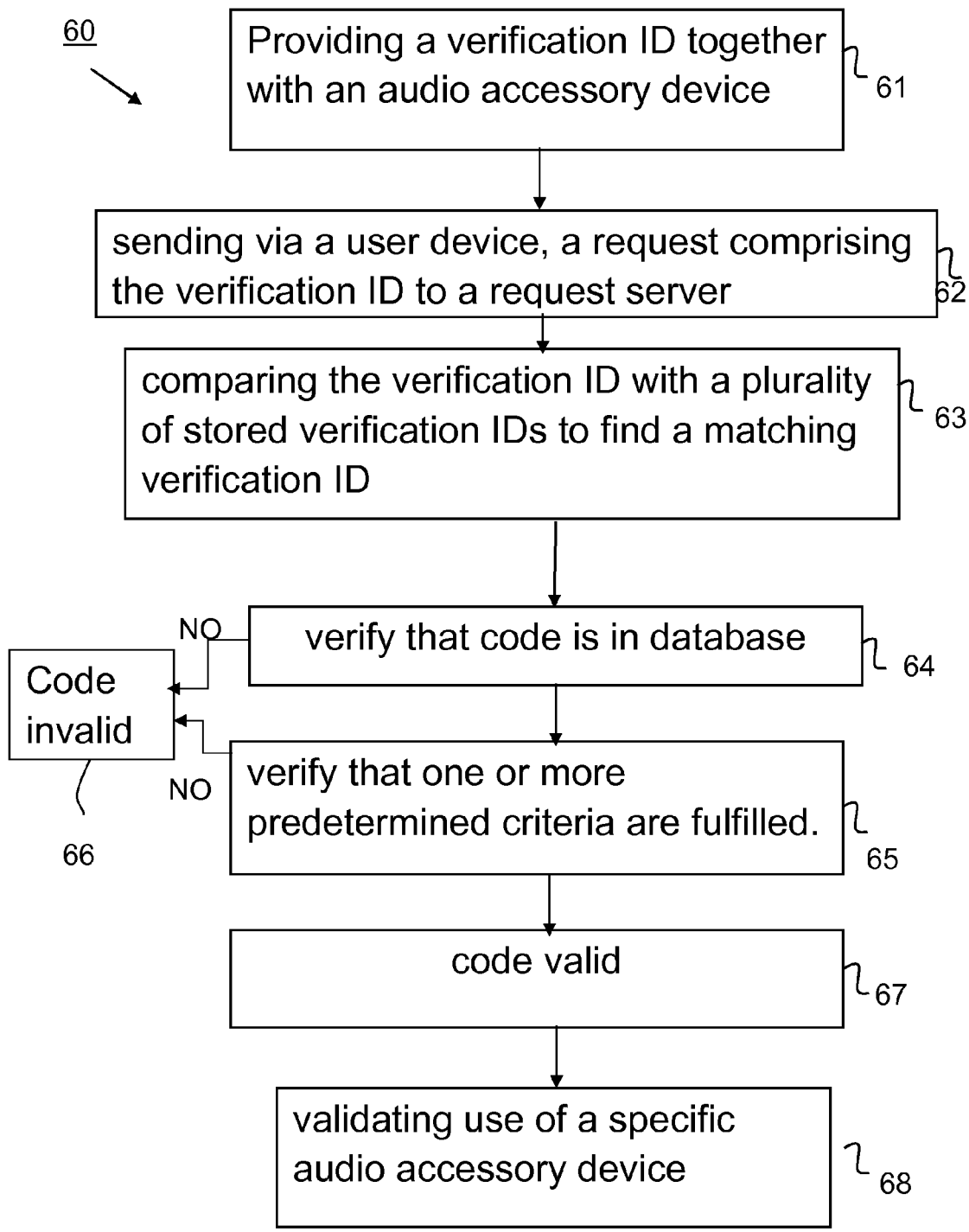
FIG. 4 is a flow chart illustrating a method of validating use of a specific audio accessory device.

In FIG. 4, a method of validating use of an audio accessory device is provided. The method 60 comprises providing a verification ID together with an audio accessory device in step 61. The verification ID identifies a specific audio accessory device. In step 63, a request comprising the verification ID is send to a request server via a user device. In step 64, the verification ID is compared with a plurality of stored verification IDs to find a matching verification ID, and in step 65 it is verified that the verification ID or code is present in the database. If not, the code is invalid, step 66. In step 67 it is checked whether one or more predetermined criteria are fulfilled. If these criteria are fulfilled, the code is valid, step 67, if one or more predetermined criteria are not fulfilled, the code is invalid, step 66. In case the code or the verification ID is valid, then the use of a specific audio accessory device is validated, step 68.

Although particular embodiments of the present inventions have been shown and described, it will be understood that it is not intended to limit the claimed inventions to the preferred embodiments, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

LIST OF REFERENCES

1 system
2 audio accessory device
3 server
4 code generating server
5 database
6, 6' verification code(s)

7 web interface
8 speaker
9, 10, 11 user device
12 computer program application
13 ID card
14 counter
15, 15' user interface
16 count value
17 maximum count value
18 request server
19 validation server
20 network interface

The invention claimed is:

1. An audio accessory device verification system comprising:
   an audio accessory device having at least one speaker and being configured to connect to at least one user device for providing audio from the user device to the audio accessory device;
   a verification ID stored or printed on a non-transitory medium, the verification ID being provided external of the audio accessory device, the verification ID identifying a specific audio accessory device;
   a request server configured to receive verification requests, the verification requests comprising the verification ID;
   a database stored in a memory, the database for storing datasets comprising corresponding sets of verification ID, one or more validation parameters, and predetermined criteria; and
   a validation server configured to validate use of a specific audio accessory device if the verification ID is found in the database stored in the memory and if the corresponding one or more validation parameters fulfil the predetermined criteria.

2. An audio accessory device verification system according to claim 1, wherein the system further comprises a counter and wherein the one or more validation parameters comprises a count value, the counter being configured to increase the count value by each validation of the specific audio accessory device, and the predetermined criteria comprises a predetermined maximum number of allowable validations so that use of the specific audio accessory device is validated if the count value is less than or equal to the predetermined maximum number of allowable verifications.

3. An audio accessory device verification system according to claim 1, wherein the audio accessory device is a wired audio accessory device.

4. An audio accessory device verification system according to claim 1, wherein the verification ID comprises audio accessory device information selected from the group of audio accessory device model information and/or audio accessory device manufacturer information.

5. An audio accessory device verification system according to claim 1, wherein the verification ID comprises an alphanumerical code, a QR code or a bar code.

6. An audio accessory device verification system according to claim 1, wherein use of the audio accessory device for a specific the computer program application is validated.

7. An audio accessory device verification system according to claim 6, wherein the computer program application comprises processing algorithms to interact with the output to and/or input from the audio accessory device.

8. An audio accessory device verification system according to claim 7, wherein the processing algorithms comprises audio enhancement algorithms.

9. An audio accessory device verification system according to claim 7, wherein the processing algorithms depend on the audio accessory device type, the audio accessory device type comprises in-the-ear headsets and over the ear headsets, mono headsets, stereo headsets, binaural headsets, monaural headsets, speakers, loudspeakers and speakerphones.

10. An audio accessory device verification system according to claim 6, wherein the computer program application is configured to receive user physiological measurements (incl. pulse, blood pressure, user monitoring) and apply processing algorithms in response to the user physiological measurements.

11. A system for verification of a user device comprising:
    an audio accessory device having at least one speaker and being configured to connect to at least one user device for providing audio from the user device to the audio accessory device;
    a computer application program stored in a non-transitory medium, the computer application program being accessible from the at least one user device;
    a verification ID stored or printed on a non-transitory medium, the verification ID provided external of the audio accessory device and comprising audio accessory device identification information identifying a specific audio accessory device;
    a user interface facilitating interaction between a user of the audio accessory device and the user device, and for user facilitated entering of the verification ID;
    a verification server configured to receive the verification ID from the user device and to verify the user device for use with the computer application program, if the verification ID is valid.

12. A system according to claim 11, wherein the verification ID is valid if one or more predetermined criteria are fulfilled.

13. A method of verifying a user device for use with a computer application program stored in a non-transitory medium, the computer application program being configured to communicate with an audio accessory device, the audio accessory device being configured to connect to at least one user device for providing audio from the user device to the audio accessory device, the method comprising:
    providing the audio accessory device together with a verification ID stored or printed on the non-transitory medium, the verification ID being provided external of the audio accessory device and comprising audio accessory device identification information identifying the audio accessory device, initiating installation of a computer application program on the at least one computing device;
    entering the verification ID on the user device via a user device user interface;
    sending the verification ID to a verification server to determine whether the verification ID is valid;
    verifying the user device for use with the computer application program, if the verification ID is valid.

14. A method of validating use of an audio accessory device, the audio accessory device having at least one speaker and being configured to connect to at least one user device for providing audio from the user device to the audio accessory device, the method comprising:
    providing a verification ID together with an audio accessory device, the verification ID being stored or printed on a non-transitory medium, the verification id identifying a specific audio accessory device;
    sending via the user device, a request comprising the verification ID to a request server configured to receive verification requests;

comparing the verification ID with a plurality of stored verification IDs to find a matching verification ID;

validating use of a specific audio accessory device if a matching verification ID is found, and if one or more predetermined criteria are fulfilled;

accessing, on the user device, a first user device application platform, and initiating activation of a computer program application; and upon validation of the verification ID, automatically completing the activation of the computer program application.

15. A method according to claim 14, wherein the method comprises accessing, on the user device, a first user device application platform and initiating activation of a computer program application, upon validation of the verification ID, automatically completing the activation of the computer program application.

16. A method of binding an audio accessory device to a computer program application, the method comprising:

generating a unique code identifying an audio accessory device;

storing the unique code in a database stored in a memory, the unique code comprising a number of generated unique codes;

extracting the unique code from the database stored in the memory and providing the code together with the audio accessory device;

downloading the computer program application from an application server to a user device;

entering the unique code on the user device and transmitting it to the database stored in the memory;

verifying the code;

if the code is valid, activating the computer program application on the user device.

\* \* \* \* \*